(12) United States Patent
Harris et al.

(10) Patent No.: US 6,817,102 B2
(45) Date of Patent: Nov. 16, 2004

(54) TRIMMER HEAD

(76) Inventors: David Harris, CMD Products, 1410 Flightline Dr., Suite D, Lincoln, CA (US) 95648; Roy Bridges, CMD Products, 1410 Flightline Dr., Suite D, Lincoln, CA (US) 95648

(*) Notice: Subject to any disclaimer, the term of this patent is extended or adjusted under 35 U.S.C. 154(b) by 0 days.

(21) Appl. No.: 10/127,924

(22) Filed: Apr. 23, 2002

(65) Prior Publication Data

US 2003/0196332 A1 Oct. 23, 2003

(51) Int. Cl.⁷ ............................................. A01D 34/412
(52) U.S. Cl. .................................... 30/276; 30/348
(58) Field of Search .......................... 30/276, 347, 348; 56/295, 289

(56) References Cited

U.S. PATENT DOCUMENTS

| | | | |
|---|---|---|---|
| 4,300,336 A | * | 11/1981 | Miyata .................. 56/295 |
| 4,856,194 A | * | 8/1989 | Lee ....................... 30/276 |
| 5,345,683 A | * | 9/1994 | Kanou .................. 30/276 |
| 5,491,962 A | * | 2/1996 | Sutliff et al. .......... 56/295 |
| 5,617,636 A | | 4/1997 | Taggett et al. |
| 5,722,172 A | * | 3/1998 | Walden ................. 30/347 |
| 5,845,405 A | | 12/1998 | Rosdahl |
| 5,862,598 A | | 1/1999 | Lee |
| 5,887,349 A | | 3/1999 | Walden |
| 6,052,907 A | | 4/2000 | Wang |
| 6,112,416 A | | 9/2000 | Bridges et al. |
| 6,119,350 A | | 9/2000 | Sutliff et al. |
| 6,249,978 B1 | | 6/2001 | Sheldon |
| 6,293,349 B1 | | 9/2001 | Marshall et al. |
| 6,446,346 B1 | * | 9/2002 | Castleman ............ 30/276 |

* cited by examiner

Primary Examiner—Hwei-Siu Payer
(74) Attorney, Agent, or Firm—Daniel P. Maguire

(57) ABSTRACT

A trimmer head for use with rotary vegetation cutting devices is disclosed. The head has a wear guide that indicates when the body of the trimmer head is worn down and needs replacement. In an embodiment of the invention, the body comprises two plates that are molded to fit together. The plates have bores for holding connecting pins. The connecting pins not only hold the plates together, but also pivotably support cutting blades, by fitting into openings in the blades.

6 Claims, 7 Drawing Sheets

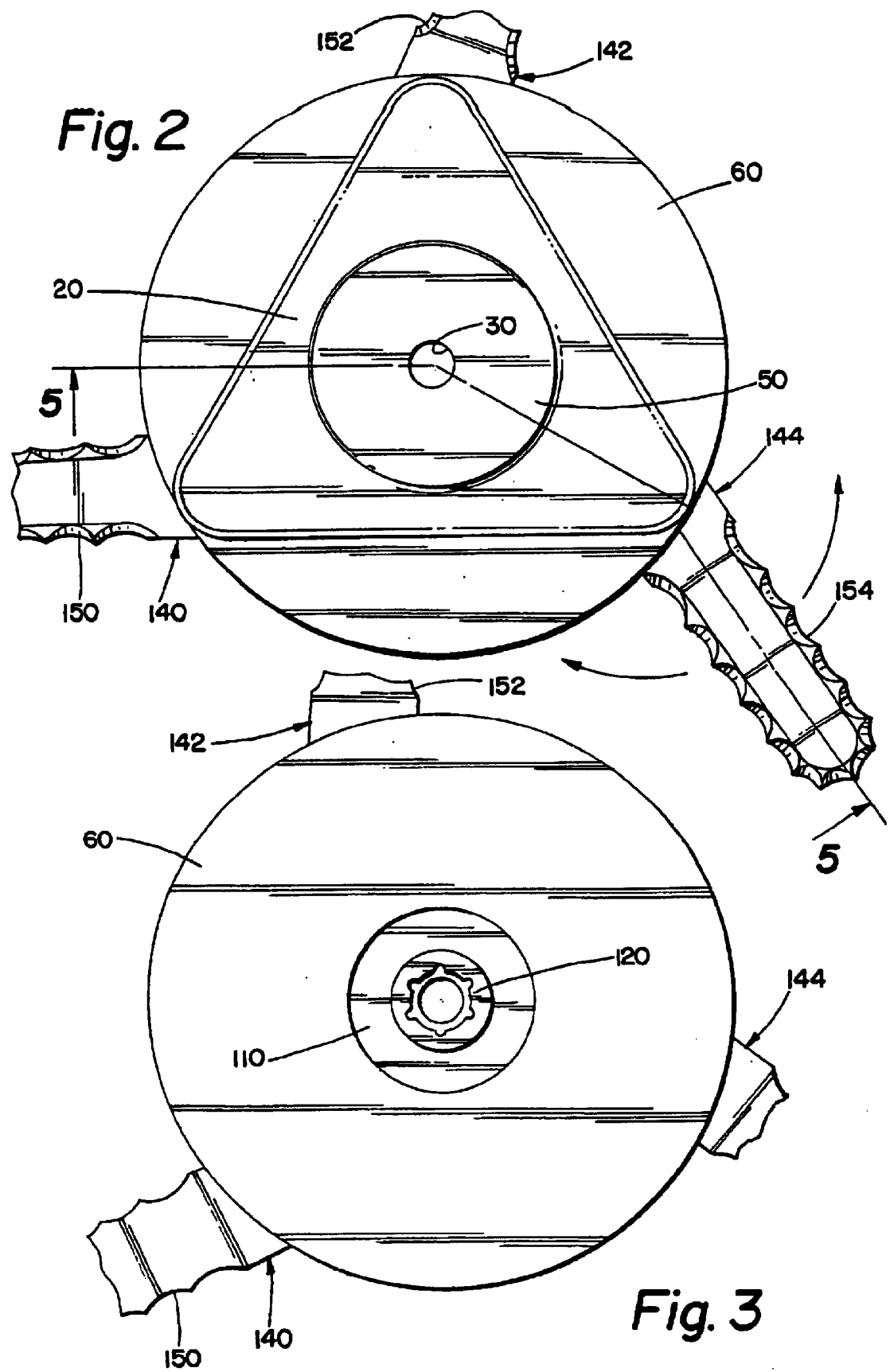

TRIMMER HEAD

FIELD OF THE INVENTION

The present invention relates to heads for attachment to rotary vegetation cutting devices.

BRIEF DESCRIPTION OF THE DRAWINGS

FIG. 2 is a top view of a trimmer head according to an embodiment of the present invention.

FIG. 3 is a bottom view of a trimmer head according to an embodiment of the present invention.

DETAILED DESCRIPTION

The present invention is a trimmer head 10, for attachment to a rotary vegetation cutter. It is comprised of a body and blazes. In one embodiment, the body is comprised of a top plate, bottom plate, and pins.

Figure 1:
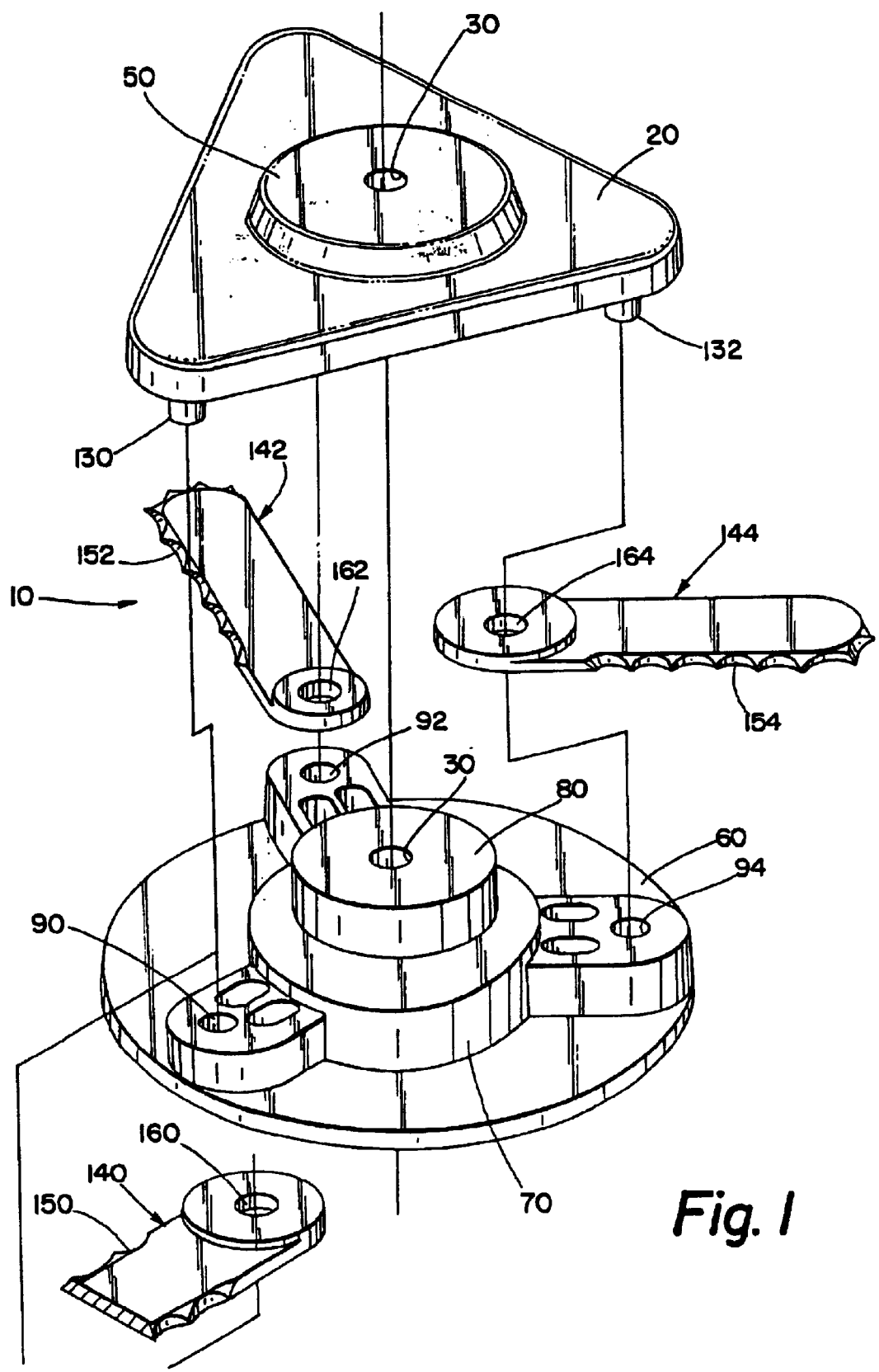
FIG. 1 is an exploded perspective view of a trimmer head according to an embodiment of the present invention.
Figure 4:
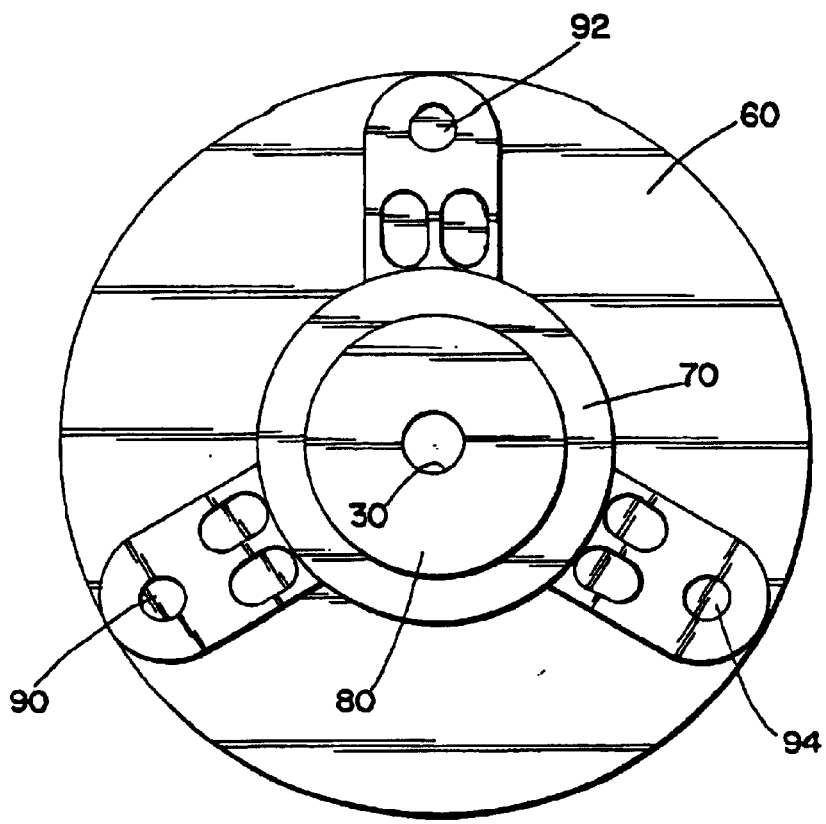
FIG. 4 is a top view of a bottom plate of a trimmer head according to an embodiment of the present invention.
Figure 6:
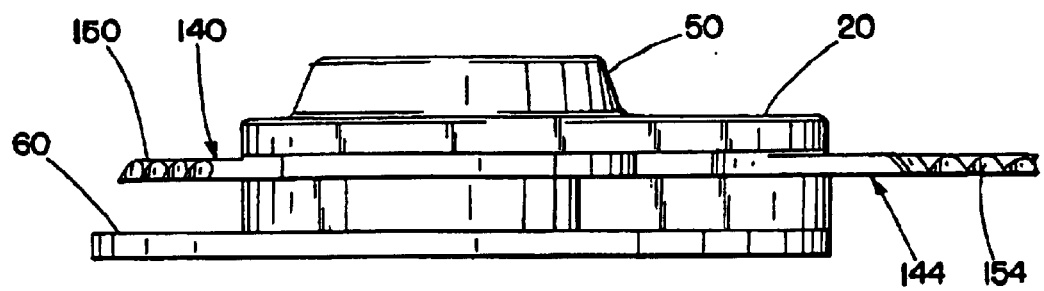
FIG. 6 is a side view of a trimmer head according to an embodiment of the present invention.
Figure 9:
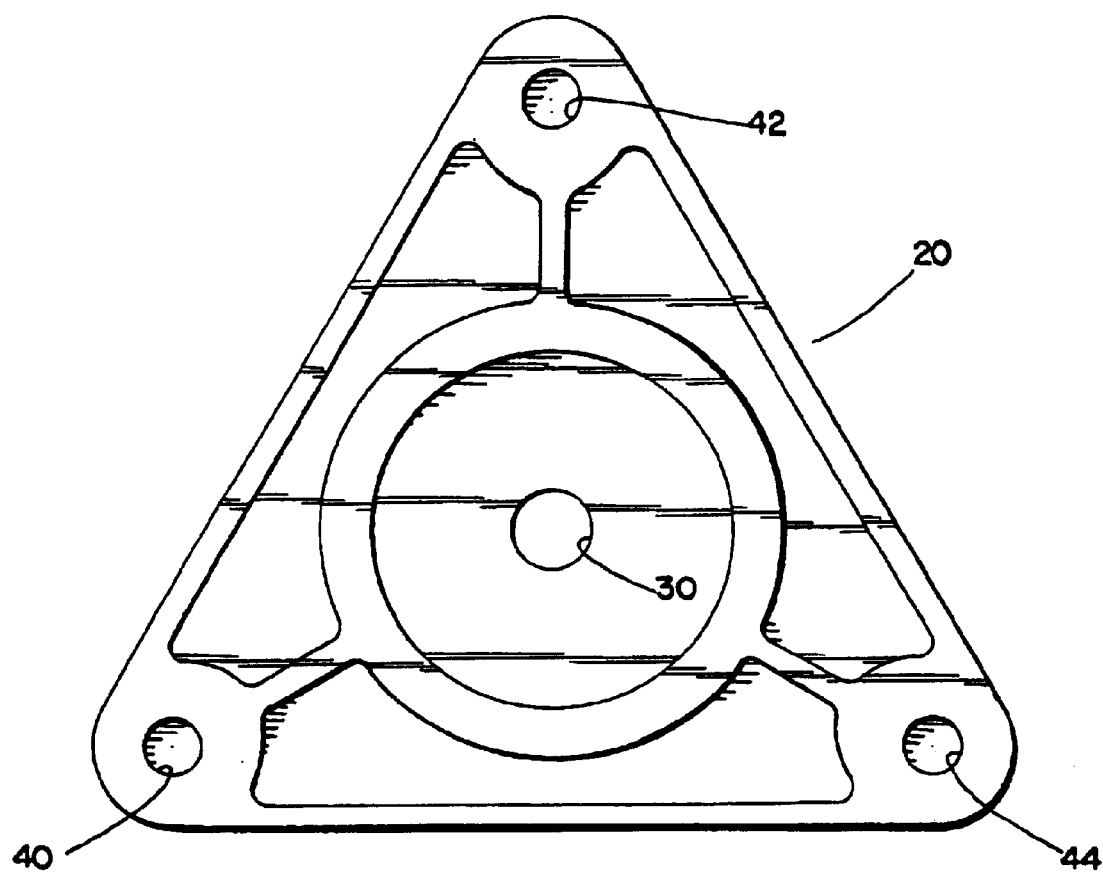
FIG. 9 is a bottom view of a top plate of a trimmer head according to an embodiment of the present invention.
Figure 10:
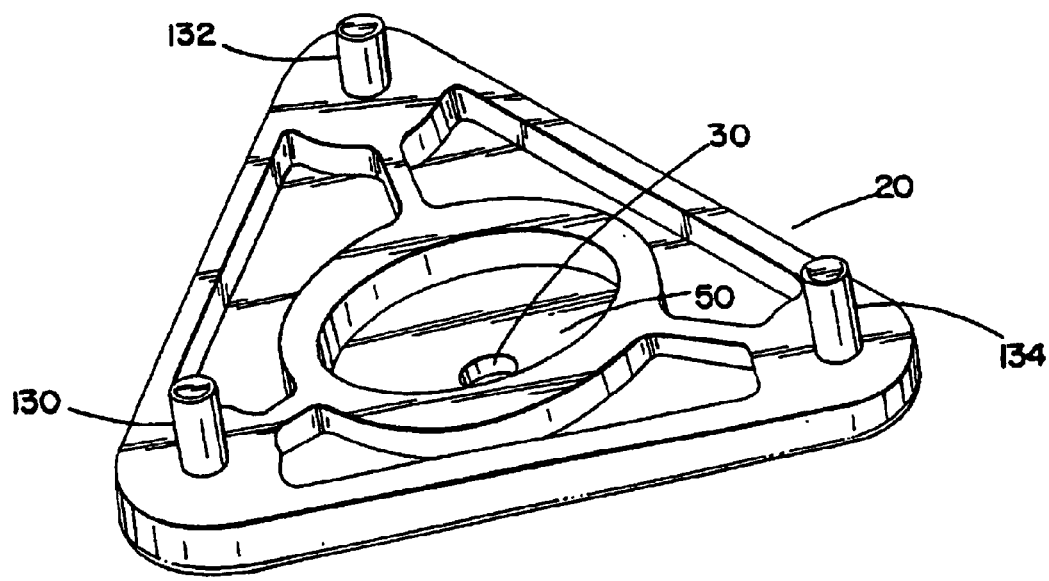
FIG. 10 is a perspective view of the interior surface of the top plate.
Figure 11:
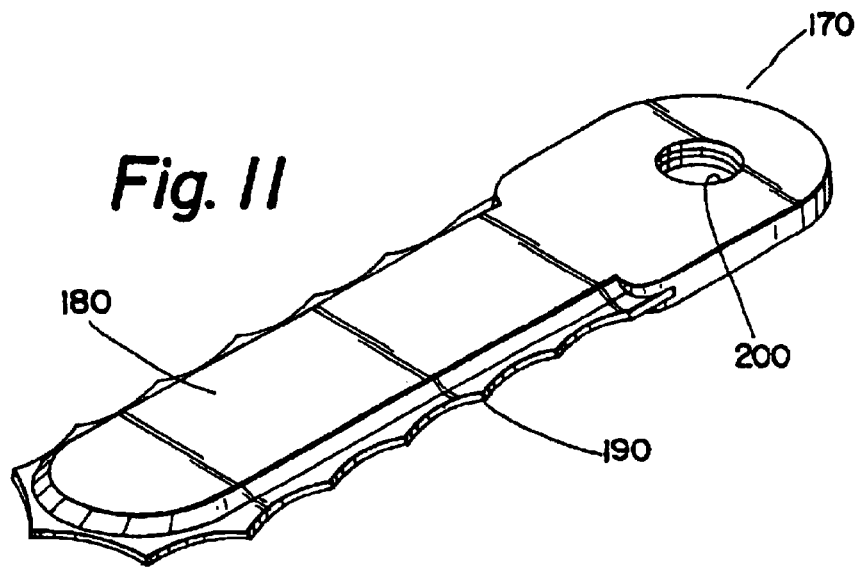
FIG. 11 is a perspective view of an embodiment of a trimmer head blade.
Figure 12:
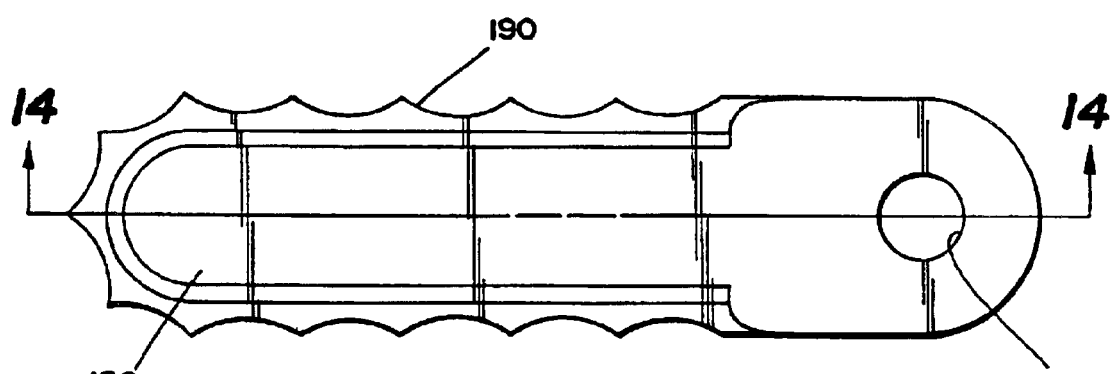
FIG. 12 is a top view of the blade depicted in FIG. 11.
Figure 13:
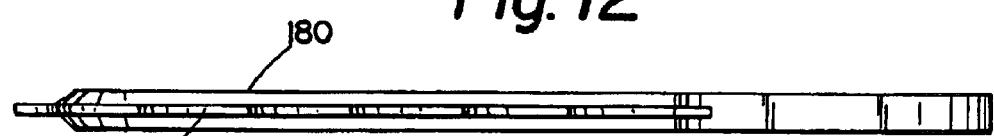
FIG. 13 is a side view of the blade depicted in FIG. 11.
Figure 14:
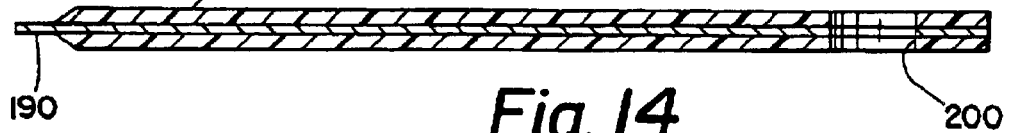
FIG. 14 is a cut-away side view of the blade depicted in FIG. 12, taken along lines 14—14.
Figure 15:
FIG. 15 is a front view of the blade depicted in FIG. 11.

As illustrated in FIGS. 1, 2 & 6, the top plate, 20, is a one-piece plate that fits over the bottom plate. A central bore 30 extends through the top plate, and the bore is sized so as to accommodate the arbor or shaft of a trimmer. As illustrated in FIG. 9, the top plate 20 has a first set of pin bores 40, 42, and 44 on its interior surface for holding pins 130, 132, and 134. The top plate also has a plate coupling well 50, which fits with the coupling boss 80 of the bottom plate 60 when the top plate 20 and bottom plate 60 are joined together.

As illustrated in FIG. 1, in an embodiment of the invention the top plate is triangular shaped, although it could also be a number of other difference shapes, including circular, square, or octagonal. etc.

As illustrated in FIGS. 1, 2, 3, 4, 5, 6, and 7, the bottom plate 60 is a one-piece plate that fits with the top plate 20 and pins to form the body of the trimmer head. The bottom plate 60 has a base 70 that extends upwardly from the bottom plate. The base 70 houses a second set of pin bores 90, 92, and 94 that can be aligned with the first set of pin bores 40, 42 and 44. Atop the base is a coupling boss 80 that is shaped and aligned so as to conjoin with the top plate's coupling well 50. The central bore 30 extends through the bottom plate.

Figure 5:
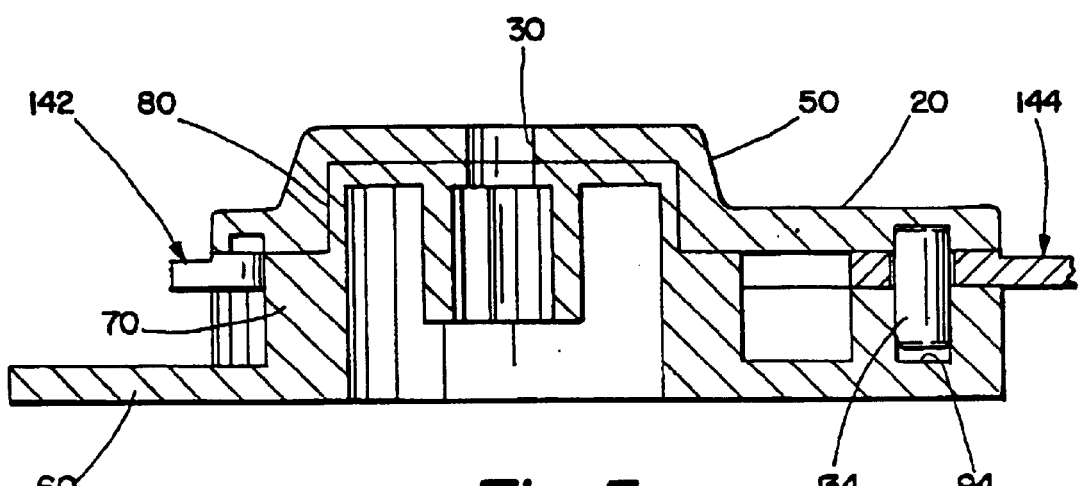
FIG. 5 is a side cut-away view of a trimmer head according to an embodiment of the present invention, taken along line 5—5 in FIG. 2.

On the exterior or bottom surface of the bottom plate is a shaft attachment depression 110 within which is a fastener well 120. As illustrated in FIG. 5, the attachment depression is essentially the hollow interior of the base 70 and the coupling boss 80, and in one embodiment of the invention the depression is circular and has a circumference less than the circumference of the coupling boss. Within the attachment depression 110 is the fastener well 120, which has side wall 122 and fitted opening 124. The central bore 30 extends through the fastener well.

As illustrated in the above-referenced figures, in an embodiment of the invention the bottom plate is circular, although it could also be a number of other different shapes, including triangular, scalloped-shape for easy removal by hand, etc.

The trimmer head is attached to a rotary vegetation cutter by inserting the shaft of the trimmer all the way through the central bore 30, and by placing a fastener, such as a hex nut or bolt, in the fastener well and securing it to the shaft. The trimmer head is designed to work with many different kinds of trimmers, and therefore different fasteners may be necessary to fit the head to different trimmers.

Figure 7:
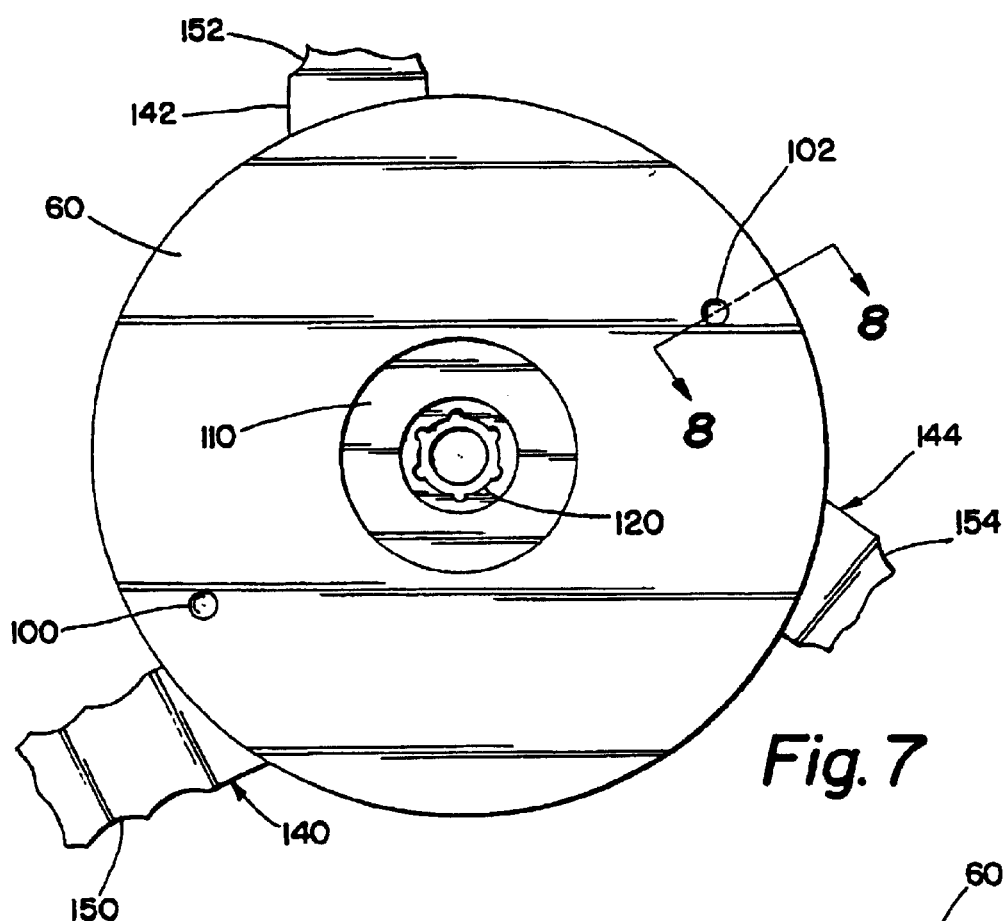
FIG. 7 is a bottom view of a trimmer head according to an embodiment of the present invention.
Figure 8:
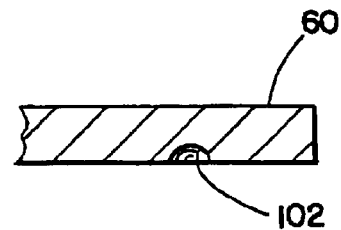
FIG. 8 is a side cut-away view of a trimmer head according to an embodiment of the present invention, taken along line 8—8 as depicted in FIG. 7.

As shown in FIGS. 7 and 8, the exterior surface of the bottom plate also may have wear guides 100 and 102. These wear guides are depressions or indentations, and as the bottom plate wears away from use, the wear guides become shallower and shallower. The user can then decide when to replace the trimmer head based on the depth of the wear guides. Other suitable wear guides could be fashioned from a protrusion that would wear away with use, tire-type treads that would wear down, or a subsurface of a different color that would be apparent when the plate wears down.

Figure 16:
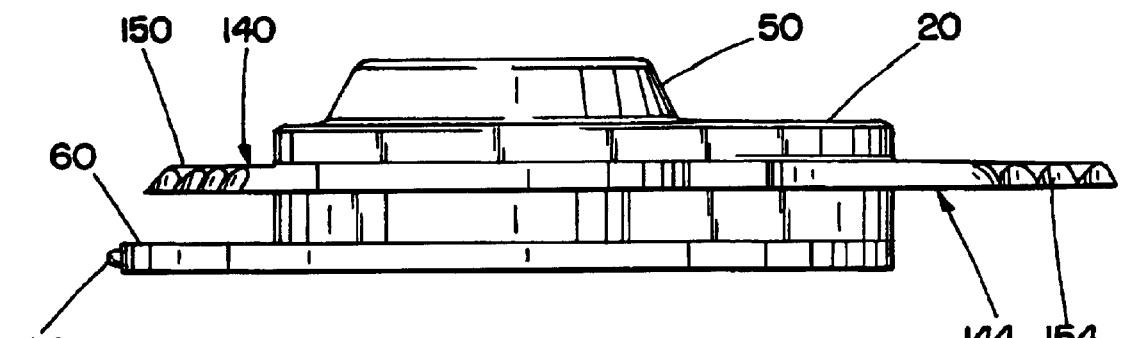
FIG. 16 is a side view of a trimmer head according to an alternative embodiment of the present invention, with a protrusion wear guide on the side.
Figure 17:
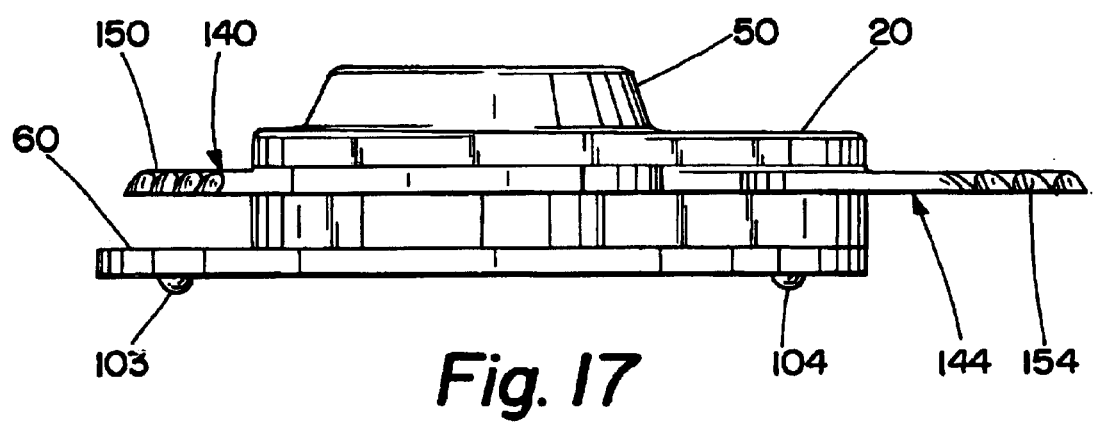
FIG. 17 is a side view of a trimmer head according to an alternative embodiment of the present invention, with a protrusion wear guide on the bottom.
Figure 18:
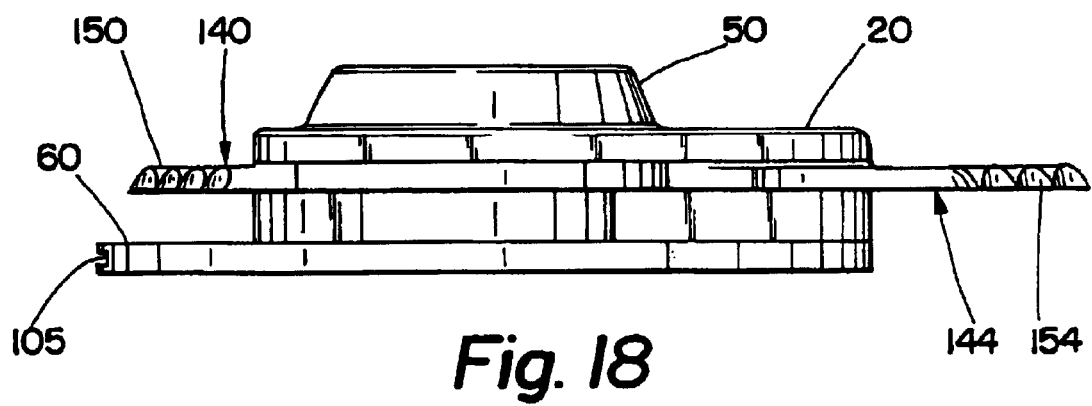
FIG. 18 is a side view of a trimmer head according to an alternative embodiment of the present invention, with an indentation wear guide on the side.

The wear guide could be placed on any portion of the body that wears down from contact or use, including but not limited to the bottom or side. FIGS. 7 and 8 show indentations 100, 102 on the bottom, FIG. 16 shows a protrusion 106 on the side, FIG. 17 shows a protrusion 103 on the bottom, and FIG. 18 shows an indentation 105 on the side.

For purposes of this patent, the following definitions apply. "Wear guide" refers to any structure that indicates the deterioration of the body of the trimmer head. "Body" refers generically to any blade-holding piece or pieces, such as the top plate and bottom plate. "Bottom portion" refers to the exterior surface of the bottom plate, or in the case of unibody versions of this invention, the bottom portion of the unibody. "Side portion" refers to any side or lateral portion of the top or bottom plate, and in the case of unibody versions of this invention, refers to any side or lateral portion of the unibody.

The top plate and bottom plate are held together with pins 130, 132, and 134, which fit into the first set of pin bores, 40, 42, and 44 and into the second set of pin bores 90, 92, and 94, as illustrated in FIG. 1. The pins are sized to tightly fit within the, pins bores 40, 42, and 44 (described below), so that pins become a part of the top plate.

The blades 140, 142, and 144 have openings 160, 162, and 164 at one end, and the blades are attached to the body by inserting the pins through the openings and into the first set of pin bores and second set of pin bores, as illustrated in FIG. 1. The blades, which rotate and pivot around the pins with the movement of the shaft, may have serrations 150, 152, 154 to enhance their cutting ability.

As shown in FIGS. 11–15, in an alternative blade embodiment, 170, the blade itself, 190, is made of metal, but has a plastic overcoat, 180, as well as an opening 200, for insertion of the pins.

The top plate, bottom plate and blades can be made of plastic, and other materials such as aluminum. The pins can be made of metal, such as steel, and also could be made of other materials.

The top plate and bottom plate can be made by injection molding, or machined using lathes and drill presses. One skilled in the art will appreciate that the present invention can be practiced by other than the described embodiments, which are presented for purposes of illustration and not limitation.

We claim:

1. A trimmer head comprising:
    a substantially triangular top plate, said top plate having an interior surface and exterior surface, and said interior surface having a first set of pin bores;
    a substantially circular bottom plate, said bottom plate having an interior surface and exterior surface, said interior surface having a second set of pin bores, and said exterior surface having a wear guide, wherein said wear guide is a protrusion;
    pins, sized so as to fit into both said first set of pin bores and said second set of pin bores; and
    blades with openings for fitting into said pins.

2. The trimmer head according to claim 1, wherein said top plate has a well for fitting with said bottom plate.

3. The trimmer head according to claim 2, wherein said bottom plate has a coupling boss for fitting with said top plate.

4. The trimmer head according to claim 1, wherein said blades are made of metal and have a plastic overcoat.

5. A method of trimming vegetation, comprising:
    providing a trimmer comprising a trimmer head, said trimmer head having a bottom and a side, and said trimmer head having a wear guide, wherein said wear guide is on said side;
    using said trimmer to cut vegetation; and
    observing said wear guide for signs of wear.

6. A method of trimming vegetation, comprising:
    providing a trimmer comprising a trimmer head, said trimmer head having a bottom and a side, and said trimmer head having a wear guide, wherein said wear guide is a depression;
    using said trimmer to cut vegetation; and
    observing said wear guide for signs of wear.

* * * * *